United States Patent [19]

Groth

[11] 3,936,657
[45] Feb. 3, 1976

[54] UNIVERSAL POSITIONING WELDING TORCH

[75] Inventor: Willis G. Groth, Creve Coeur, Mo.

[73] Assignee: ACF Industries, Incorporated, New York, N.Y.

[22] Filed: July 5, 1974

[21] Appl. No.: 486,155

[52] U.S. Cl. ............... 219/136; 219/130; 226/199
[51] Int. Cl.² ........................................... B23K 9/00
[58] Field of Search ............ 219/130, 136, 74, 124, 219/125 R; 226/199

[56] References Cited
UNITED STATES PATENTS

| | | | |
|---|---|---|---|
| 3,102,947 | 9/1963 | Blackman | 219/130 |
| 3,260,834 | 7/1966 | Arnoldy | 219/130 X |
| 3,594,534 | 7/1971 | Benfield | 219/125 R |

FOREIGN PATENTS OR APPLICATIONS

| | | | |
|---|---|---|---|
| 258,489 | 4/1970 | U.S.S.R. | 219/130 |

Primary Examiner—J. V. Truhe
Assistant Examiner—Clifford C. Shaw
Attorney, Agent, or Firm—Henry W. Cummings

[57] ABSTRACT

An adapter is affixed to a conventional weld wire feed roll assembly said adapter having a first opening through which the weld wire passes generally toward the target area. The adapter comprises a second opening which is at a skew angle to said first opening and a third opening which is also at a skew angle and having a larger diameter than to the second opening. A weld guide is inserted into the third opening and the weld guide is bent at its lower portion to intersect the center line of the first opening. Rotational means are affixed to the adapter and weld guide respectively, so that selective rotation of the adapter and weld guide will allow intersection of any point within the weld target area.

14 Claims, 4 Drawing Figures

UNIVERSAL POSITIONING WELDING TORCH

BACKGROUND OF THE INVENTION

Experience with the size, precision and reliability of two-axis welding arc position-adjusting mechanisms and systems has been less than satisfactory. Contemplating a requirement for installing a series of 40 weld tips on 4 inch centers, there appeared to be no available system of sufficient compactness to be practical.

Torch location to a center line tolerance of ± ⅛ inch is relatively easily obtained, but wire straightness, contact tube concentricity and wear easily introduce another ⅛ inch in arc location. Thus a system was desired capable of adjustment anywhere within a circle of approximately a 1 inch diameter or larger.

It is an object of the present invention to obtain compactness of point adjustment of closely located weld tips without equipment interference.

It is another object of the present invention to simplify the welding assembly to obtain improved reliability.

It is another object of the present invention to avoid the need for slides and/or swing pivots for locating a point within a target area.

Another object of the present invention is to provide a welding arrangement which achieves the above objects and which is readily mounted on existing weld wire feed assemblies.

Other objects will be apparent from the following description and drawings.

THE DRAWINGS

SUMMARY OF THE INVENTION

Figure 1:
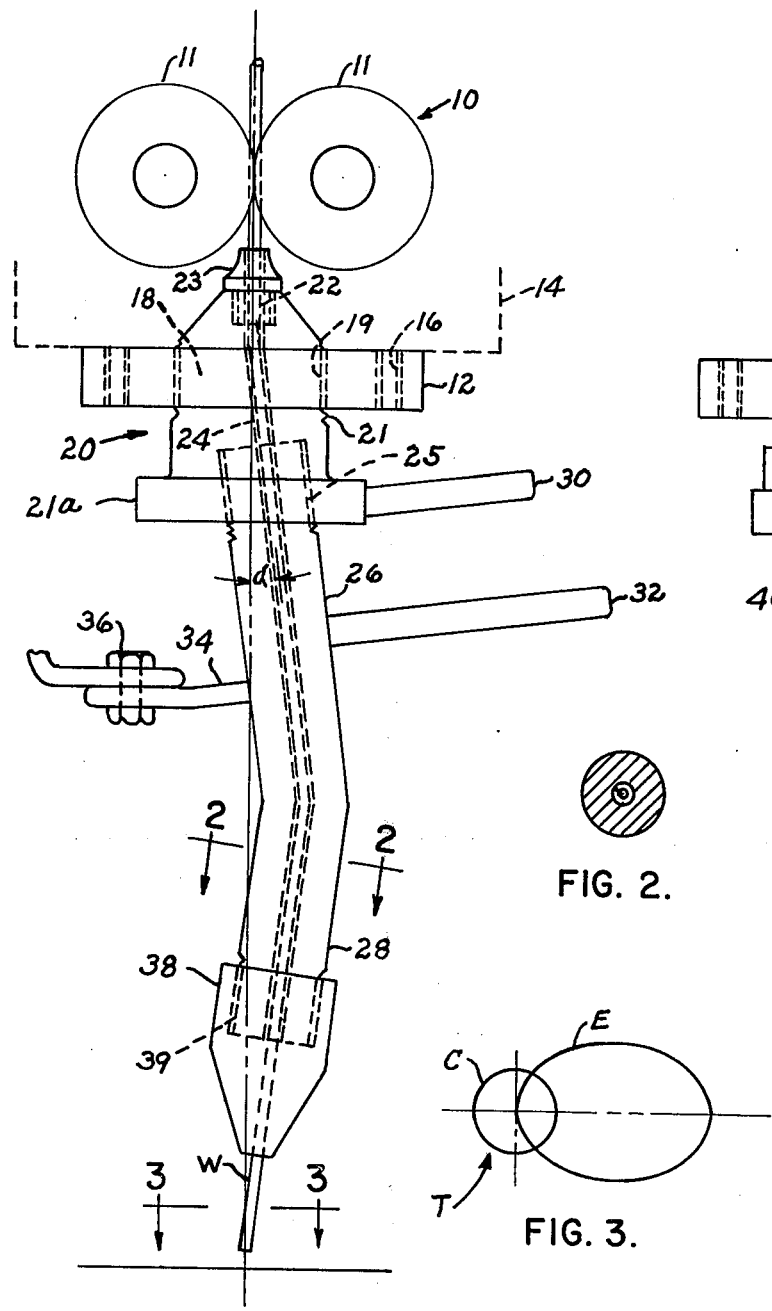
FIG. 1 is a schematic sectional view illustrating the welding assembly of the present invention.

An adapter is affixed to a conventional weld wire feed assembly said adapter having a first opening through which the weld wire passes generally toward the target area and into which a welding adapter is fitted. The welding adapter comprises a second opening which is at a skew angle to said first opening. A third opening is provided also at a skew angle to the second opening and having a larger diameter than said second opening. A weld guide is provided in the third opening. The weld guide is bent at its lower portion to intersect the center line of the first opening. Means for rotating are provided respectively on the weld guide and adapter. Rotating the adapter defines a circle on the work piece. Rotating the weld guide defines an ellipse on the target. Selective rotation of both elements will allow intersection of any point within the weld target area.

DETAILED DESCRIPTION

A conventional roll weld wire feed assembly indicated generally at 10 having rolls 11 is provided for feeding the weld wire. A plate 12 having a plate opening 18 therein, is affixed to the welding assembly frame 14 with appropriate fasteners 16.

An adapter 20 is inserted into the plate opening, for example, by means of cooperating threads 19 and 21. The adapter comprises a first adapter opening 22 which is circular and generally perpendicular to the target. A second opening 24 is provided at a skew angle to the second opening at the angle γ of 1° to 30° to the first opening, preferably 2° to 15°, openings 22 and 24, for example, may comprise drilled bores.

A weld wire guide 26 is inserted into a third opening, 25 for example, with threads 25a. The weld guide is bent at its lower portion 28 so as to intersect the center line 29 of the second opening 22. A conventional welding 38 tip may then be attached to the lower portion of weld guide 26, for example, with threads 39.

Weld current attachment means may be provided at any convenient place on the assembly. For example, an extension 34 may be integrally affixed by welding or with fasteners to weld guide 26. Electrical connection can then be made to extension 34 by means of a removable fastener 36. It will be apparent to those skilled in the art that a wide variety of electrical attachment arrangements may be utilized in the welding assembly of the present invention.

First rotating means, for example, a handle 30 is provided on the adapter whereby the weld rod W may be rotated to define a circle C on the target plane. Second rotation means, for example, comprising a handle 32 is also provided whereby the weld guide 26 may be rotated to define an ellipse E on the target. Rotation of both elements will allow intersection of any point P within the target area.

Thus, without moving the welding assembly from place to place, any point within a target area can be welded by appropriate rotation of the adapter and/or the weld guide.

DESCRIPTION OF PREFERRED EMBODIMENT

Assuming a vertical (for simplicity) weldwire axis upon exit from the wiredrive mechanism, and a 1 inch diameter target T whose center falls on the weldwire axis 29, an attachment plate 12 is bored and threaded to be mounted within the hole 18 concentric to the wire axis and in a plane perpendicular thereto.

Adapter 20 is provided with a male thread 21 to engage threads 19 on plate 12, a flange 21a to limit engagement depth, and two separate but connected and coordinated bores 22 and 24. The upper bore 22 is concentric with the weldwire center line and sized to accept an inlet guide 23 which may or may not be threaded in place.

An opening or bore 24 is provided in adapter 20 whose axis lies in the plane of the wire, but whose axis, in this plane, is at an angle 65 of 1 to 30 degrees thereto, preferably 2° to 15°. At practical working distance of about 10 inches from plate 12 to arc location (T), rotation of adapter 20 around its wire axis causes an extension of the skew axis to intersect a target plane perpendicular to the axis of rotation to sweep the circumference of a circle of less than the approximate 1 inch diameter desired.

Threaded into the skew bore 25 is a weld wire guide 26 which is bent (below the threads) at 28 sufficiently to cause its lower bore center line to intersect the center of the target area at the specified working distance. Rotation of this bent element 26 within the adapter opening 24 causes an extension of its axis to describe an ellipse E on the target plane. Since this ellipse can be rotated around the original wire axis by rotating the adapter 20, selective rotation of adapter and weld guide allows intersection any point within the target area T. If desired, angles may be selected in such a way that this can be achieved by an approximately 90° (−45°, 0, +45°) sweep of both elements.

While threading is convenient and eliminates the need for clamps, retaining rings and/or other fixtures and thus is a practical attachment means the adapter and weld guide need not be threaded.

Figure 4:
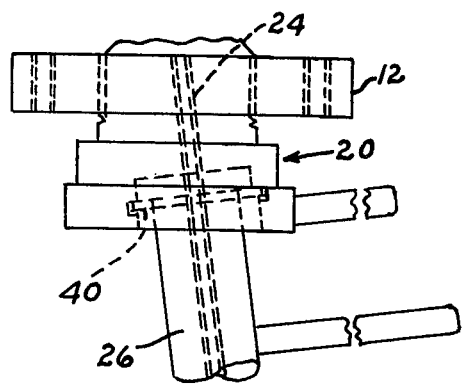
FIG. 4 is a side elevational view of an alternative attachment arrangement illustrating a snap ring attachment between the adapter and weld guide.
Figure 2:
FIG. 2 is a sectional view along the lines 2—2 in FIG. 1.
Figure 3:
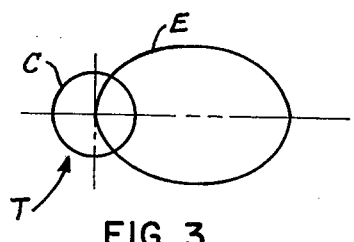
FIG. 3 is a sectional view along the lines 3—3 in FIG. 1.

For example, as shown in FIG. 4 a snap ring 40 may be used in place of the threads 25a to hold the weld guide 26 in engagement at the skew angle in the adapter 20. This is also a very practical attachment means. It will be apparent to those skilled in the art that a variety or practical means are available to resist unscheduled rotation of either element.

While simple handles have been illustrated as the rotating means, it will be apparent that a variety of other rotational means may be provided, such as gear driven, motor or engine driven.

What is claimed is:

1. Apparatus for welding comprising: means for feeding weld wire in a general direction toward a target work piece having a target area thereon, the weld wire passing through a welding assembly and through an adapter attachment portion having an adapter attachment opening therein; an adapter fitted into said adapter attachment opening, said adapter having a first adapter opening which is generally circular and of smaller diameter than said attachment opening; said first adapter opening defining a weld wire axis generally perpendicular to said target; said adapter having a second adapter opening at a skew angle to said weld wire axis to define a skew axis; said second adapter opening being in communication with said first adapter opening; said adapter having a third adapter opening also at a skew angle to said weld wire axis having a greater diameter than said second opening and in communication with said second opening; a weld guide fitted into said third adapter opening along said skew axis; said weld guide being bent at a portion external from said third adapter opening so as to intersect said weld wire axis; weld wire adapted to pass through said first, second and third adapter openings during welding; first manual operating means for selectively manually rotating said adapter about said weld wire axis to generally define a circle on said target when said target is perpendicular to said weld wire axis; and second manual operating means for selectively manually rotating said weld guide about said skew axis to define generally an ellipse on said target whereby selective manual rotation of said adapter and weld guide will allow intersection by said weld wire of any point within the target area.

2. Apparatus according to claim 1 wherein said skew angle makes an angle of about 1° and 30° with said weld wire axis.

3. Apparatus according to claim 1 wherein said adapter is held in engagement with said adapter attachment opening with adapter attachment mechanical fasteners.

4. Welding apparatus according to claim 3 wherein said weld guide is held in engagement with said third opening with weld guide attachment mechanical fasteners.

5. Welding apparatus according to claim 4 wherein said adapter attachment mechanical fasteners comprise cooperating threads.

6. Welding apparatus according to claim 5 wherein said weld guide attachment mechanical fasteners comprise cooperating threads.

7. Welding apparatus according to claim 4 wherein said weld guide attachment mechanical fasteners comprise at least one snap ring.

8. Welding apparatus according to claim 1 wherein said first and second manual operating means comprise handles.

9. Apparatus for welding comprising: means for feeding weld wire in a general direction toward a target work piece having a target area thereon, the weld wire passing through a welding assembly and through an adapter attachment plate having a plate opening therein; an adapter held in said opening with adapter attachment mechanical fasteners; said adapter having a first adapter opening which is generally circular and of smaller diameter than said plate opening; said first adapter opening defining a weld wire axis generally perpendicular to said target; said adapter having a second adapter opening at a skew angle of about 1° to 30° to said weld wire axis; said second adapter opening being in communication with said first adapter opening; said adapter having a third adapter opening also at a skew angle to said weld wire axis, having a greater diameter than said second opening and in communication with said second opening; a weld guide held in said third adapter opening along said skew angle axis with weld guide attachment mechanical fasteners; said weld guide being bent at a portion external from said third adapter opening so as to intersect said weld wire axis; weld wire adapted to pass through said first, second and third adapter openings during welding; first manual operating means for selectively manually rotating said adapter about said weld wire axis to generally define a circle on said target when said target is perpendicular to said weld wire axis; and second manual operating means for selectively manually rotating said weld guide about said skew axis to define generally an ellipse on said target whereby selective manual rotation of said adapter and weld guide will allow intersection by said weld wire of any point within the target area.

10. Welding apparatus according to claim 9 wherein said adapter attachment mechanical fasteners comprise cooperating threads.

11. Welding apparatus according to claim 10 wherein said weld guide attachment mechanical fasteners comprise cooperating threads.

12. Weld apparatus according to claim 10 wherein said weld guide attachment mechanical fasteners comprise at least one snap ring.

13. Welding apparatus according to claim 11 wherein said first and second manual operating means comprise handles.

14. Apparatus according to claim 9 wherein said skew angle makes an angle of about 2° to 15° with said weld wire axis.

* * * * *

UNITED STATES PATENT OFFICE
CERTIFICATE OF CORRECTION

PATENT NO. : 3,936,657
DATED : February 3, 1976
INVENTOR(S) : Willis G. Groth

It is certified that error appears in the above-identified patent and that said Letters Patent are hereby corrected as shown below:

Column 2, line 53, "angle 65" should read -- angle $\alpha$ --.
Column 3, line 15, "or" should read -- of --.

Signed and Sealed this

Tenth Day of August 1976

[SEAL]

Attest:

RUTH C. MASON
Attesting Officer

C. MARSHALL DANN
Commissioner of Patents and Trademarks